(12) United States Patent
Miura et al.

(10) Patent No.: US 7,017,613 B2
(45) Date of Patent: Mar. 28, 2006

(54) SEGMENT FOR REHABILITATING PIPE ASSEMBLY

(75) Inventors: Katsuyori Miura, Hiratsuka (JP);
Makoto Ishida, Hiratsuka (JP); Koji Kaneta, Hiratsuka (JP); Kenji Fujii, Hiratsuka (JP); Takao Kamiyama, Hiratsuka (JP)

(73) Assignee: Shonan Gosei-Jushi Seisakusho K.K., Kanagawa-ken (JP)

( * ) Notice: Subject to any disclaimer, the term of this patent is extended or adjusted under 35 U.S.C. 154(b) by 0 days.

(21) Appl. No.: 11/054,534

(22) Filed: Feb. 9, 2005

(65) Prior Publication Data

US 2005/0205148 A1    Sep. 22, 2005

(30) Foreign Application Priority Data

Mar. 22, 2004    (JP) ............................. 2004-081801

(51) Int. Cl.
*F16L 55/16* (2006.01)

(52) U.S. Cl. .................. 138/98; 138/155; 138/176; 405/184.1

(58) Field of Classification Search ............... 138/97, 138/98, 155, 174, 176; 405/146, 152, 153, 405/184.1, 184.2
See application file for complete search history.

(56) References Cited

U.S. PATENT DOCUMENTS

| | | | | |
|---|---|---|---|---|
| 4,799,824 A | * | 1/1989 | Kumai et al. | 405/146 |
| 5,186,217 A | * | 2/1993 | Kallinich et al. | 138/149 |
| 5,472,295 A | * | 12/1995 | Ikeda et al. | 405/152 |
| 5,927,346 A | * | 7/1999 | Majnaric et al. | 138/175 |
| 6,468,000 B1 | * | 10/2002 | McNally et al. | 405/150.1 |
| 6,796,334 B1 | * | 9/2004 | Ishikawa et al. | 138/98 |
| 2003/0136455 A1 | * | 7/2003 | Kamiyama et al. | 138/98 |
| 2004/0108009 A1 | * | 6/2004 | Kamiyama et al. | 138/97 |

\* cited by examiner

*Primary Examiner*—James Hook
(74) *Attorney, Agent, or Firm*—Adams & Wilks

(57) ABSTRACT

A segment is coupled to additional segments to constitute a rehabilitating pipe for repairing an existing pipe. The segment comprises an inner plate that defines the inner circumferential surface of the rehabilitating pipe and has an opening therein for performing the work of mutually coupling the segments in the circumferential direction of the rehabilitating pipe, and a cover that is fitted into the opening from the bottom surface side of the inner plate. To fix the cover to the inner plate, the cover is provided with a projection and with an engaging member that is movable between non-engaging and engaging positions. The cover is fitted into the opening with the projection into engagement with the inner plate on one side edge of the opening and the engaging member is then brought into engagement with the inner plate on the other side edge thereof, thereby fixing the cover to the inner plate to plug the opening thereof.

10 Claims, 19 Drawing Sheets

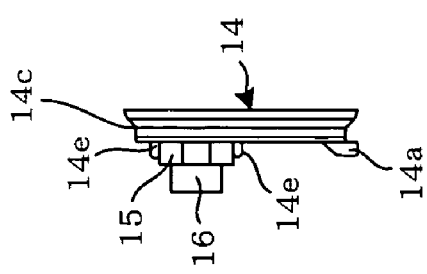
FIG. 14c
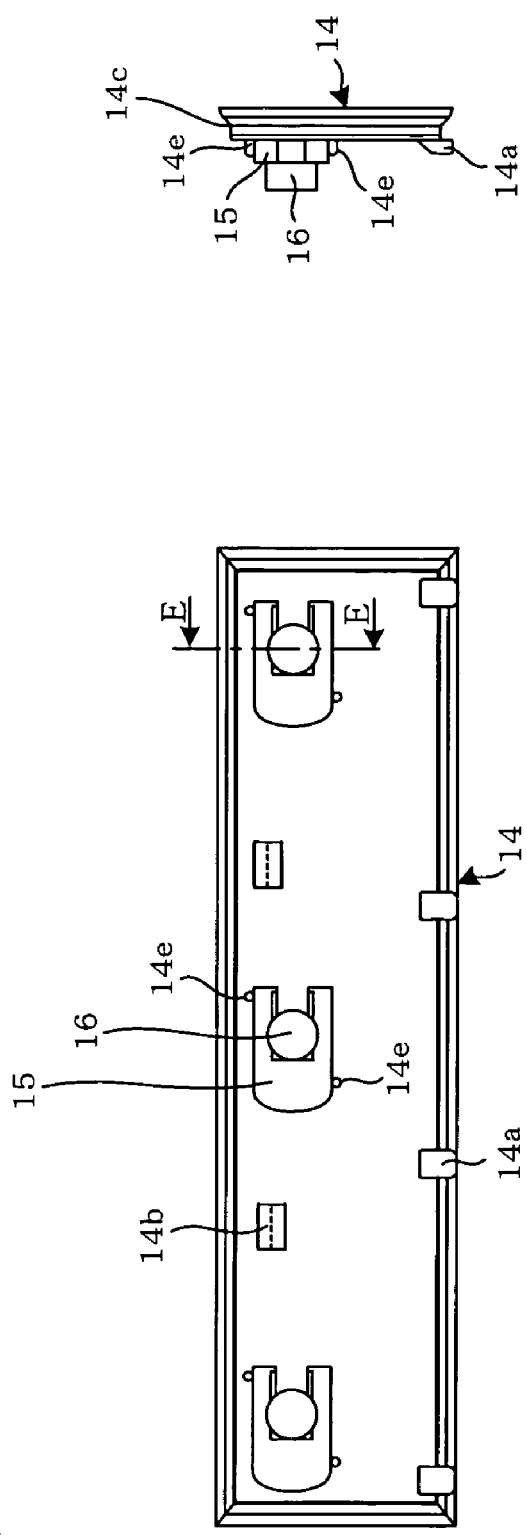
FIG. 14a
FIG. 14b

SEGMENT FOR REHABILITATING PIPE ASSEMBLY

BACKGROUND OF THE INVENTION

1. Field of the Invention

The present invention relates to a segment for a rehabilitating pipe assembly, and more particularly to a segment that is coupled to additional segments to constitute a rehabilitating pipe assembly for rehabilitating an existing pipe such as a sewer pipe.

2. Description of the Prior Art

A method of rehabilitating an existing pipe is known from Japanese Published Patent Application No. 2003-286742 and the like, wherein a compound pipe is constructed to rehabilitate an existing pipe, such as a sewer pipe, by assembling inside an existing pipe a rehabilitating pipe whose outer diameter is slightly less than the inner diameter of the existing pipe, and then filling and hardening a filler in the gap between the outer periphery of the rehabilitating pipe and the inner wall surface of the existing pipe. The rehabilitating pipe is a circular pipe assembled, as shown in FIG. 20 for cases wherein the diameter is approximately 1,000–1,800 mm, by an assembly worker S who assembles, inside a manhole in communication with the existing pipe, short ring-shaped pipe units 2 that constitute the rehabilitating pipe 3 by coupling a plurality of segments 1 in a direction corresponding to the circumferential direction of the rehabilitating pipe 3, and then carrying these pipe units 2 into the existing pipe and successively coupling them in the longitudinal direction (hereinafter, referred to as ring assembly).

Since ring assembly is problematic for the case wherein the rehabilitating pipe 3 has a large diameter of approximately 2,000 mm or greater, as shown in FIG. 21, or the case wherein the rehabilitating pipe 3 is a rectangular pipe, as shown in FIG. 22, the worker S assembles the rehabilitating pipe 3 inside the existing pipe by successively coupling the segments 1 in units, one by one, in the longitudinal direction and the circumferential direction of the rehabilitating pipe 3 (hereinafter, referred to as segmental assembly).

Each segment 1 has an inner plate that constitutes an inner circumferential surface of the rehabilitating pipe 3, and in this inner plate at both end parts are formed rectangular openings (refer to the openings 101a in FIG. 4) for performing the work of mutually coupling the segments 1 with bolts and nuts in a direction corresponding to the circumferential direction of the rehabilitating pipe 3. After the completion of the mutual coupling of the segments in the circumferential direction by the existing pipe rehabilitation work, a cover is fixed to the opening to plug it. The following methods are conventionally used for fixing the cover:

(1) method of engaging a flange formed in the cover;

(2) method wherein the cover is slid into and interfitted with a groove; and (3) method of ultrasonic welding.

In method (1), the cover 201 is fixed by coating a sealing material (not shown) on the side surface of the perimeter of a rectangular cover 201 wherein flanges 202 are formed at both end parts in the longitudinal direction, as shown in FIG. 23 a and FIG. 23b, and, by fitting the cover 201 into the opening 101a of the inner plate of the segment, as shown in FIG. 24, then elastically deforming each of the flanges 202 and engaging them to the respective engaging holes 204 formed in the side plates 203 of the segment facing both ends of the opening 101a.

In method (2), the cover is fixed by forming a groove in both side edges along the longitudinal direction of the opening, forming protruding parts on both side edges along the longitudinal direction of the cover, coating a sealing material on the side surface of the perimeter of the cover, then inserting the protruding parts of the cover into the grooves of the opening, and sliding and engaging the cover to the back in the longitudinal direction.

In method (3), the cover is fixed by fitting the cover into the opening, and then ultrasonically welding the peripheral edge part of the cover to the peripheral edge part of the opening.

In the abovementioned fixing method (1), clearance is needed between each flange 202 and the engaging surface of a respective engaging hole 204, as shown by the enlargement of the engaging portion on the upper right side of FIG. 24, in order to elastically deform and engage the flanges 202 of the cover 201. If this clearance is absent, then the flanges 202 do not successfully engage with the engaging surfaces of the engaging holes 204, and they unfortunately disengage easily.

If, however, the abovementioned clearance is present, the pressure from the filler is applied downward to the cover 201 in FIG. 24 when the filler is filled in the gap between the outer periphery of the rehabilitating pipe and the inner wall surface of the existing pipe after assembly of the rehabilitating pipe. This causes the cover 201 to be displaced downward by just the portion of the abovementioned clearance. A gap is thus created between the side surface of the peripheral edge of the cover 201 and the inner surface of the peripheral edge of the opening, and the watertightness in the opening portion may no longer be able to be maintained.

In addition, in the fixing method (2), when interfitting the protruding parts of the cover to the grooves of the opening and sliding the cover all the way in the longitudinal direction, the sealing material coated on both side edges of the cover may unfortunately delaminate due to the sliding, and the sealing effect may unfortunately be markedly impaired. In addition, clearance is also needed for interfitting between the protruding parts and the grooves, and the maintenance of watertightness in the opening portion unfortunately degrades.

In addition, the fixing method (3), based on ultrasonic welding, is effective only if ring assembly is performed as shown in FIG. 20, and there is a problem in that it cannot be applied to segmental assembly as shown in FIG. 21 or FIG. 22.

The present invention solves the abovementioned problems, and has an object to provide a fixing structure that, in segments for the rehabilitating pipe assembly, fixes a cover to an opening for performing the work of mutually coupling segments in a direction corresponding to the circumferential direction of the rehabilitating pipe, and that can ensure sufficient watertightness in the portion of the opening plugged by the fixing of the cover, as well as that can be applied to both ring assembly and segmental assembly of the rehabilitating pipe.

SUMMARY OF THE INVENTION

A segment according to the invention is coupled to additional segments to constitute a rehabilitating pipe for rehabilitating an existing pipe, and the segment comprises an inner plate that defines the inner circumferential surface of the rehabilitating pipe and has an opening therein for performing the work of mutually coupling the segments in the circumferential direction of the rehabilitating pipe, and a cover that is fitted into the opening of the inner plate. For fixing to the inner plate, the cover is provided with a projection and with an engaging member that is movable between non-engaging and engaging positions. The cover is fitted into the opening with the projection into engagement with the inner plate on one side edge of the opening and the engaging member is then moved to the engaging position where it comes into engagement with the inner plate on the other side edge thereof, thereby fixing the cover to the inner plate to plug the opening thereof.

The structure of fixing the cover used for the segments for the rehabilitating pipe assembly according to the present invention obtains superior effects in that watertightness in the portion of the opening wherein the cover is fixed can be adequately ensured, and in that it can be applied even in cases where the rehabilitating pipe is ring assembled as well as segmental assembled because the sealing material coated on the side surface of the perimeter of the cover does not delaminate, and because clearance is not created between the side surfaces of the perimeter of the opening and the perimeter of the cover even if the pressure from the filler is applied in the state wherein the cover is fixed.

Further features of the invention, its nature and various advantages will be more apparent from the accompanying drawings and following detailed description of the invention.

BRIEF DESCRIPTION OF THE DRAWINGS

FIG. 14a is a top view showing the structure of the cover that plugs the opening of the inner plate of the segment;

FIG. 14b is a side view taken along the longitudinal direction;

FIG. 14c is a side view taken along the latitudinal direction;

FIG. 16 is a cross-sectional view taken along the E—E line in FIG. 14a;

DESCRIPTION OF THE PREFERRED EMBODIMENTS

Figure 1:
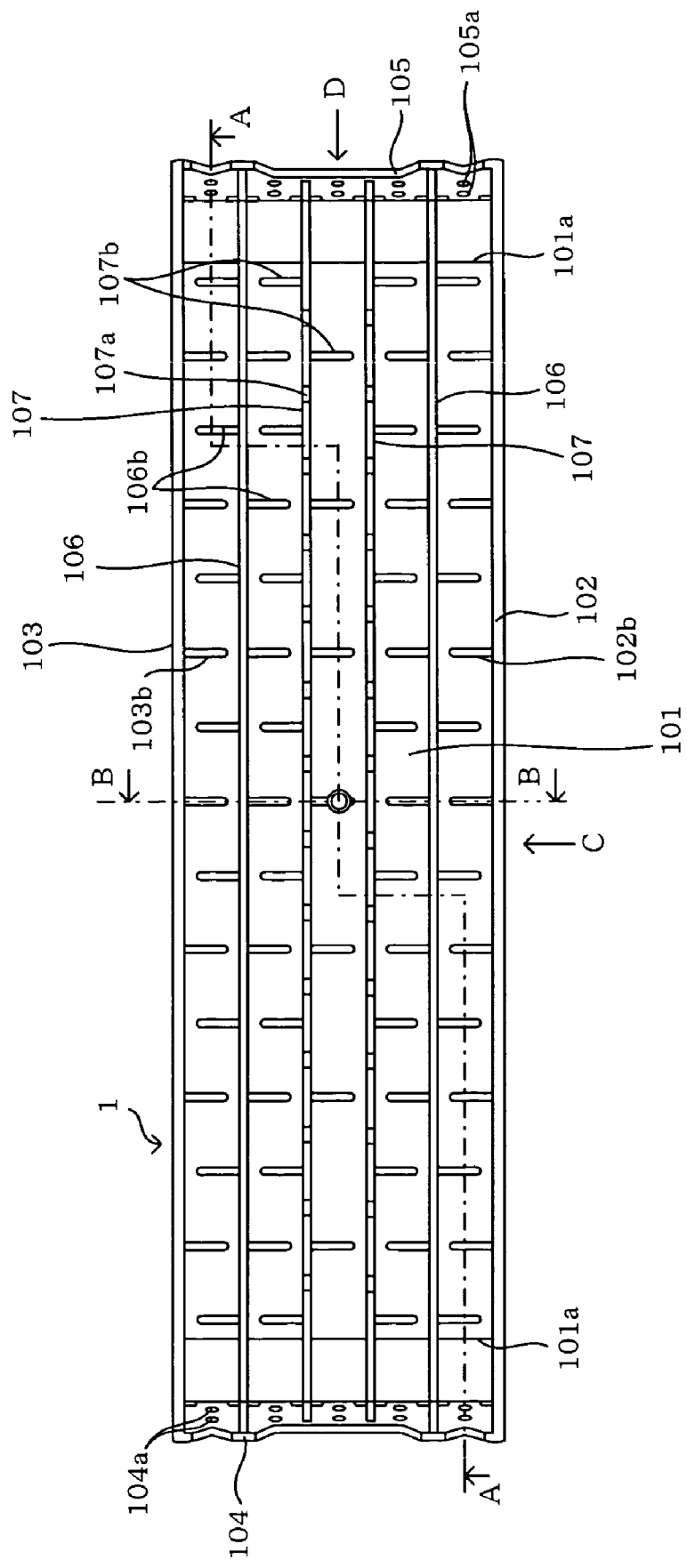
FIG. 1 is a top view showing the structure of a rehabilitating pipe segment according to the invention adapted for use in assembling a rehabilitating pipe that rehabilitates an existing pipe.

The present invention will be described based on preferred embodiments, referring to the drawings.

Figure 11:
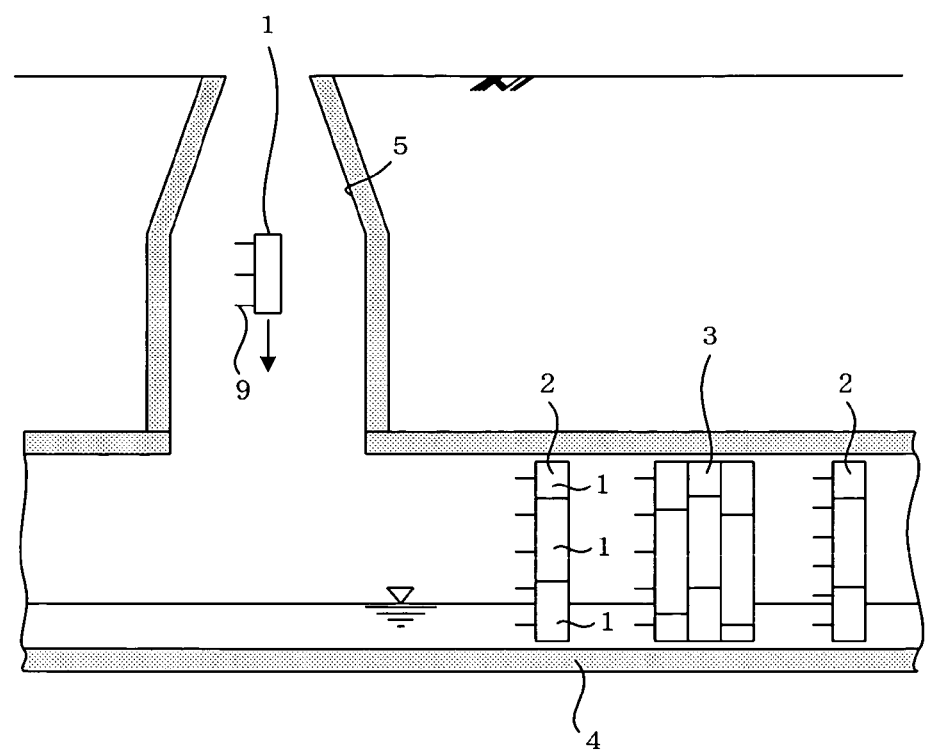
FIG. 11 is a cross-sectional view showing how the rehabilitating pipe for rehabilitating the existing pipe is assembled by carrying segments into the existing pipe and then coupling the pipe units.
Figure 12:
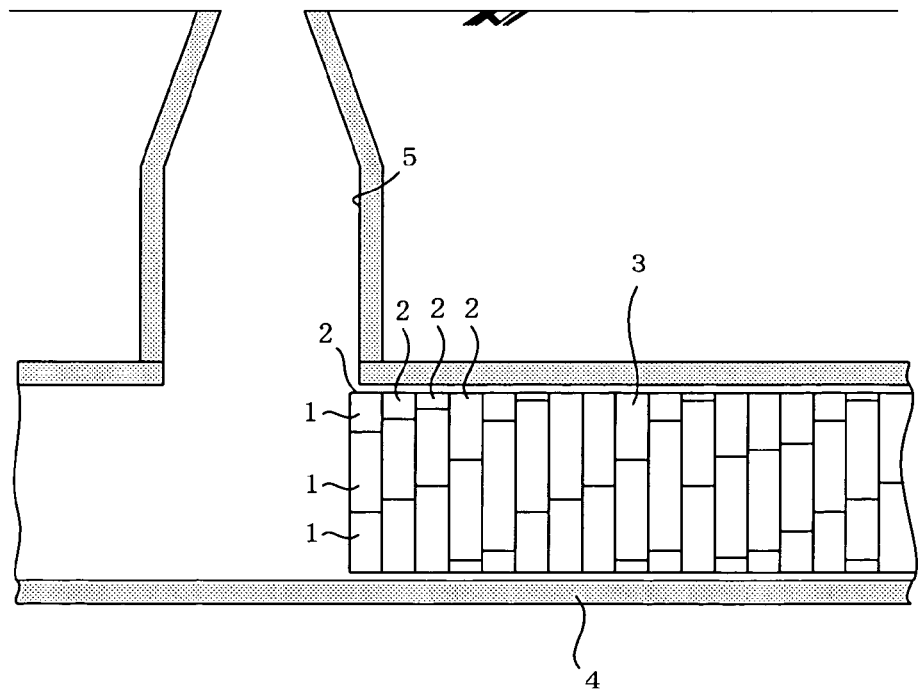
FIG. 12 is a cross-sectional view showing how the entire length of the rehabilitating pipe is assembled.

A segment or segment member 1 is used to constitute a rehabilitating pipe assembly for rehabilitating the existing pipe such as a sewer pipe. A rehabilitating pipe 3 is assembled inside an existing pipe 4 as shown in FIG. 11 and FIG. 12 by coupling short, circular, ring-shaped pipe units 2. The segment corresponds to one of pieces obtained by dividing the pipe unit 2 into a plurality of equal parts (e.g., five equal parts) in the circumferential direction. The pipe unit 2 is assembled by coupling a plurality of segments 1 in the circumferential direction of the rehabilitating pipe 3, and the thus assembled pipe units are successively coupled in the longitudinal direction of the rehabilitating pipe 3 to construct the rehabilitating pipe 3. Furthermore, although ring assembly is used to construct the rehabilitating pipe in the present embodiment, segmental assembly is also acceptable. In addition, although a circular pipe is employed as the rehabilitating pipe in the present embodiment, it is understood that the present invention can be applied even to a segment used in a case wherein the cross-sectional shape orthogonal to the longitudinal direction is a shape other than a circle, e.g., a rectangular, as well as to a case wherein the cross-sectional shape of the rehabilitating pipe is not a closed shape, as in a literal pipe, but rather is an open shape on one side, e.g., a horseshoe shape or a semicircular shape.

Figure 2:
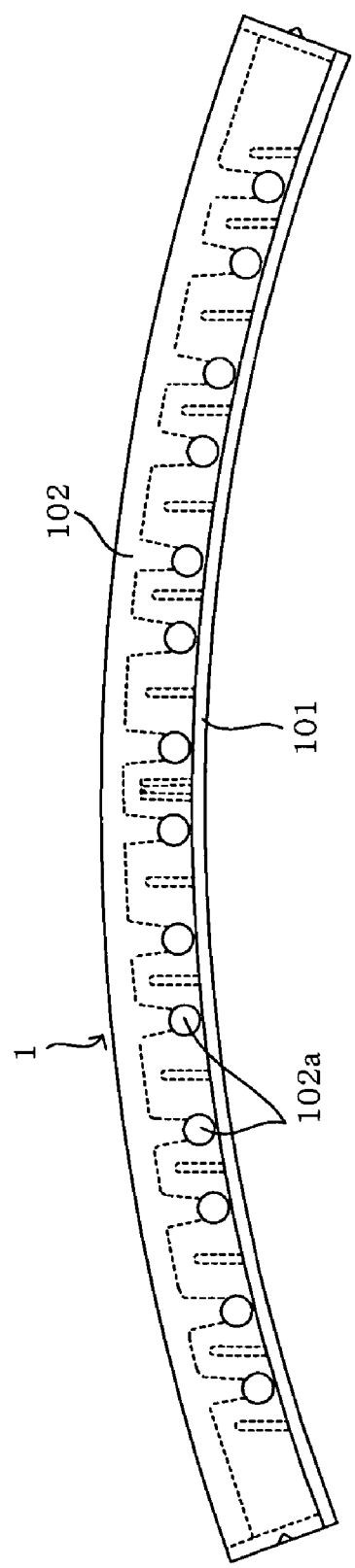
FIG. 2 is a side view shown from the arrow direction C in FIG. 1.
Figure 3:
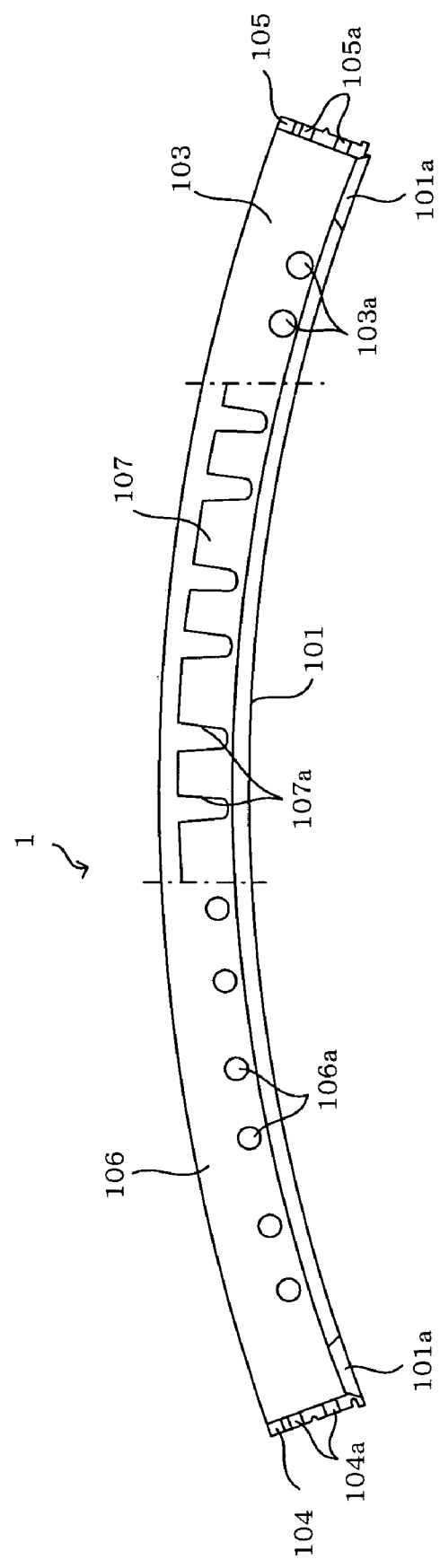
FIG. 3 is a cross-sectional view taken along the A—A line in FIG. 1.
Figure 4:
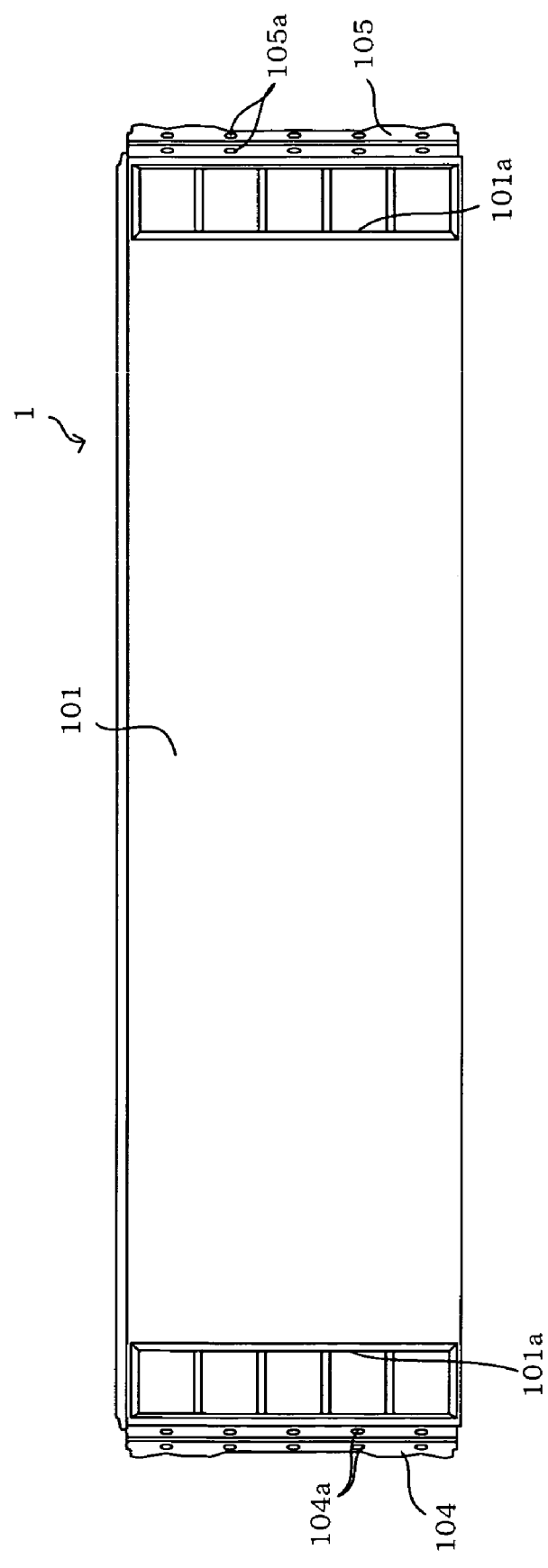
FIG. 4 is a bottom view of the segment.

FIG. 1 through FIG. 4 show the structure of the segment 1 of the present embodiment. FIG. 1 is a top view of the entire segment 1. FIG. 2 is a side view viewed in the arrow direction C in FIG. 1. FIG. 3 is a cross-sectional view taken along the A—A line in FIG. 1. FIG. 4 is a bottom view of the segment 1.

The segment or segment member 1 serves as a rehabilitating pipe segment and includes an inner plate 101 that is curved in an arc-shape with the arc angle at a prescribed angle, e.g., 72 degrees, and whose bottom surface (the inner surface of the abovementioned arc) constitutes and defines the inner circumferential surface of the pipe unit 2. At the top surface of the inner plate (the outer surface of the arc), side plates 102 and 103 are provided upright outwardly along both side edges extending in the circumferential direction of the arc. End plates 104 and 105 are also provided upright outwardly along both end edges of the arc of the inner plate. In addition, two tall outside reinforcing plates 106 and short inside reinforcing plates 107 are respectively provided upright outwardly on the inner plate along the circumferential direction of the arc. These plates 101 through 107 are integrally molded from transparent plastics to form the integral segment 1 made of a plastic.

Rectangular openings 101a, whose lengths are slightly less than the width of the inner plate 101, are respectively formed along the lower edges of the end plates 104 and 105 at both end parts of the arc of the inner plate 101. The inner surfaces of the perimeter of each opening 101a in every direction are inclined so that they widen from the top surface (outer surface) side to the bottom surface (inner surface) side of the inner plate 101 (refer to FIG. 7). These openings 101a are for the purpose of performing from the inside the work of tightening the bolts 6 (refer to FIG. 8 and FIG. 9) for mutually coupling the segments 1 in the circumferential direction of the pipe units 2, i.e., in a direction corresponding to the circumferential direction of the rehabilitating pipe 3. After that tightening work, a cover 14 (refer to FIG. 14), discussed later, is fixed to each opening 101a to plug it.

Figure 10:
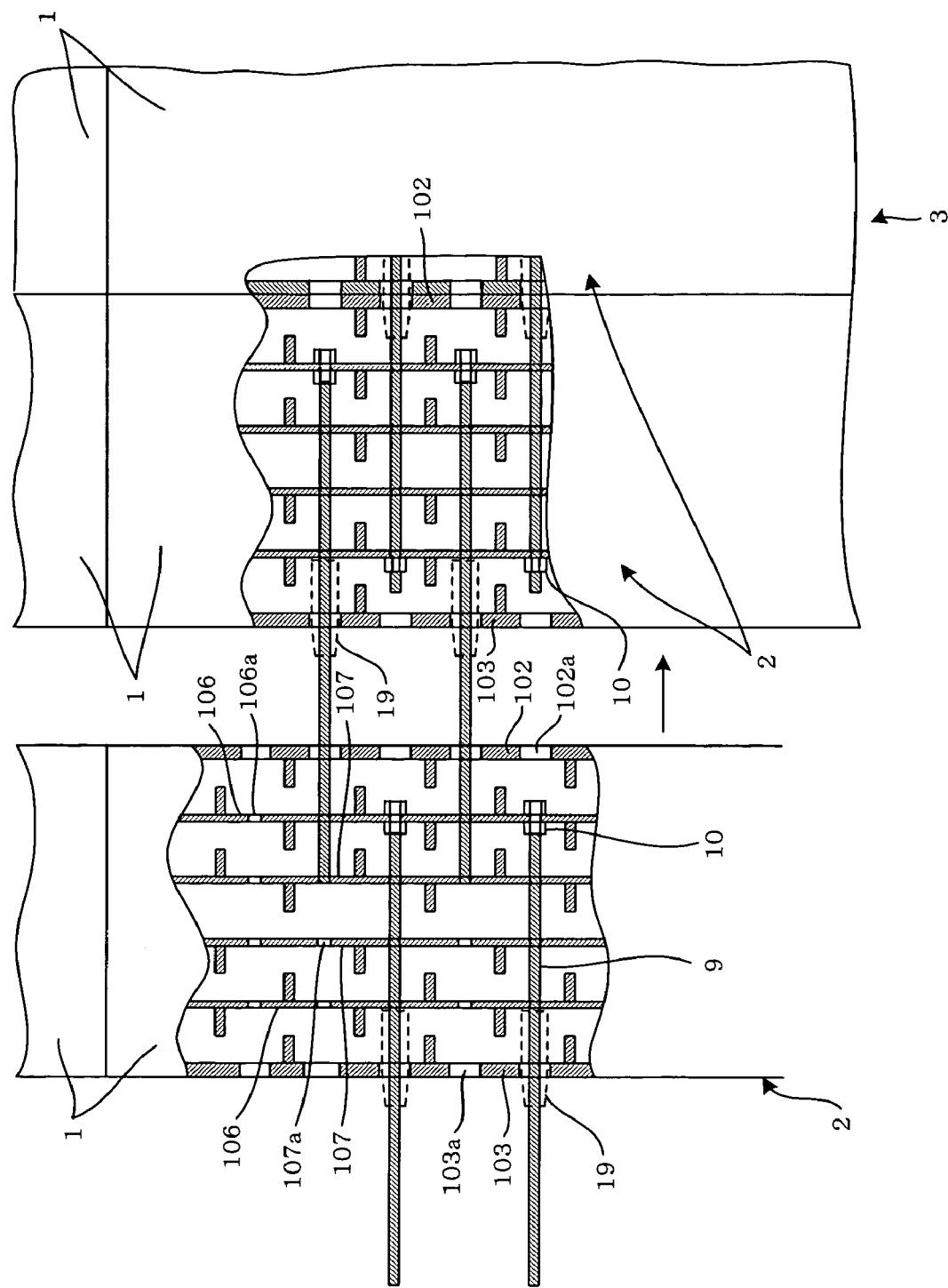
FIG. 10 is a partially broken cross-sectional view showing the method of mutually coupling the pipe units, each of which is constituted by the coupling of segments.

A plurality (herein, 14) of bolt through holes 102a and 103a is formed in each of the side plates 102 and 103 at a prescribed interval in the circumferential direction of the abovementioned arc. The diameter thereof is slightly greater than the diameter of the head of the bolt 9 or of the nut 10 for mutually coupling the pipe units 2, as shown in FIG. 10.

Figure 5:
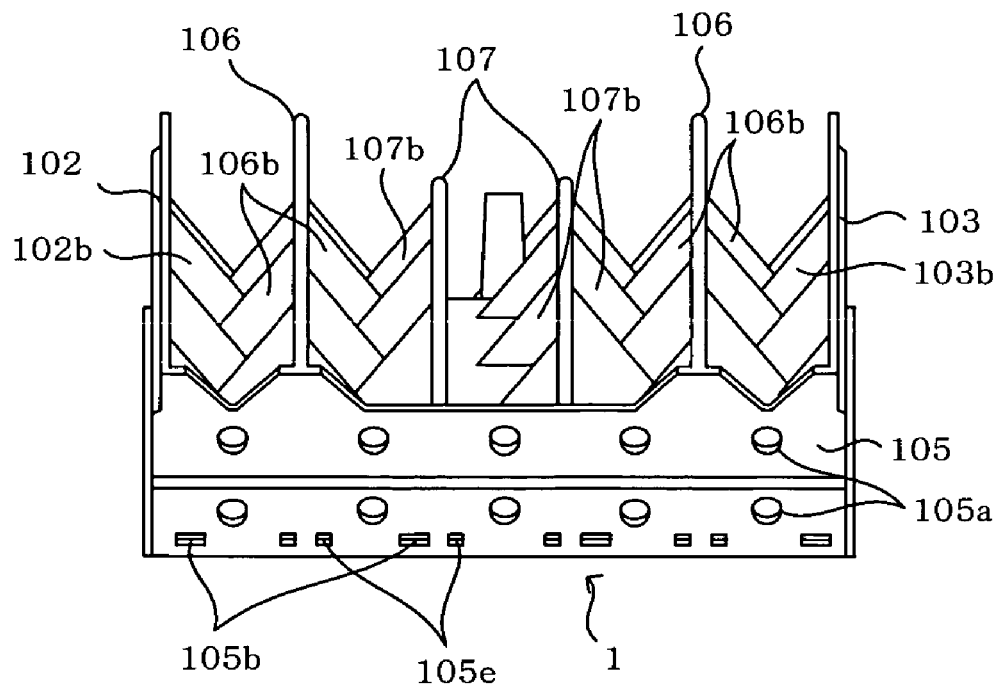
FIG. 5 is an auxiliary view in the arrow direction D of FIG. 1.
Figure 7:
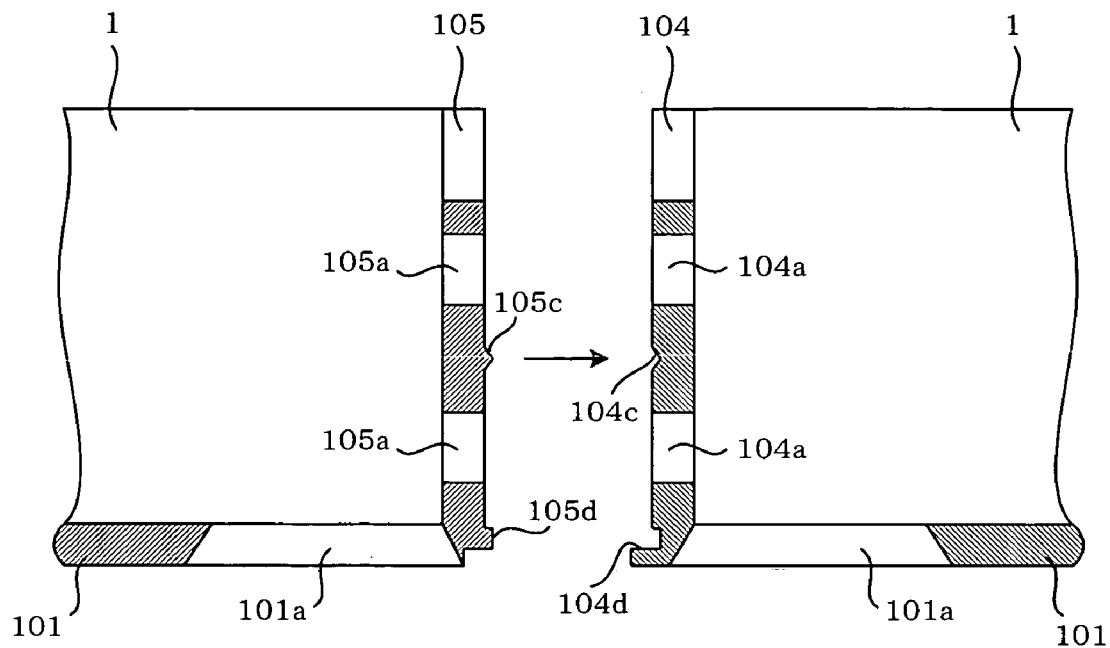
FIG. 7 is a longitudinal side view showing the method of mutually coupling the segments.

A pair of bolt through holes 104a and 105a for inserting therethrough the bolts 6 (refer to FIG. 8 and FIG. 9) for mutually coupling the segments 1 in a direction corresponding to the circumferential direction are formed in each of the end plates 104 and 105 at five locations defined by the partition by the reinforcing plates 106 and 107. In addition, as depicted in FIG. 5 (auxiliary view in the arrow direction D of FIG. 1), a plurality of engaging holes 105b is formed at a plurality of locations along the longitudinal direction of the opening 101a in the end plate 105 at its lower end part continuous with the top surface of the inner plate 101. These are for engaging each of the plurality of projections 14a (refer to FIG. 14) of the cover 14, discussed later. A plurality of engaging holes 104b (refer to FIG. 18) is likewise formed in the end plate 104. In addition, air bleeding holes 105e are formed at a plurality of locations at the lower end part of the end plate 105, and air bleeding holes (not shown) are likewise formed in the end plate 104. In addition, as shown in FIG. 7, a V-shaped groove 104c is formed at the center part on the outside surface of the end plate 104; and a mating part 104d with a groove on the upper side and a protrusion on the lower side is formed at the lower end thereof. In addition, a protruding part 105c and a mating part 105d, each having a shape respectively the opposite of the groove 104c and the mating part 104d, are formed at corresponding positions on the outside surface of the end plate 105.

The reinforcing plates 106 and 107 serve to reinforce the mechanical strength of the entire segment 1, and therein are formed a plurality of bolt through holes 106a and notched parts 107a for inserting bolts 9 (refer to FIG. 10) for coupling the pipe units 2, and these holes are formed at a position respectively corresponding to the bolt through holes 102a and 103a of the side plates 102 and 103. The diameter of the bolt through hole 106a is just slightly greater than the diameter of the shaft part of the bolt 9, but is less than the diameter of the head of the bolt 9 or the diameter of the nut 10.

Figure 6:
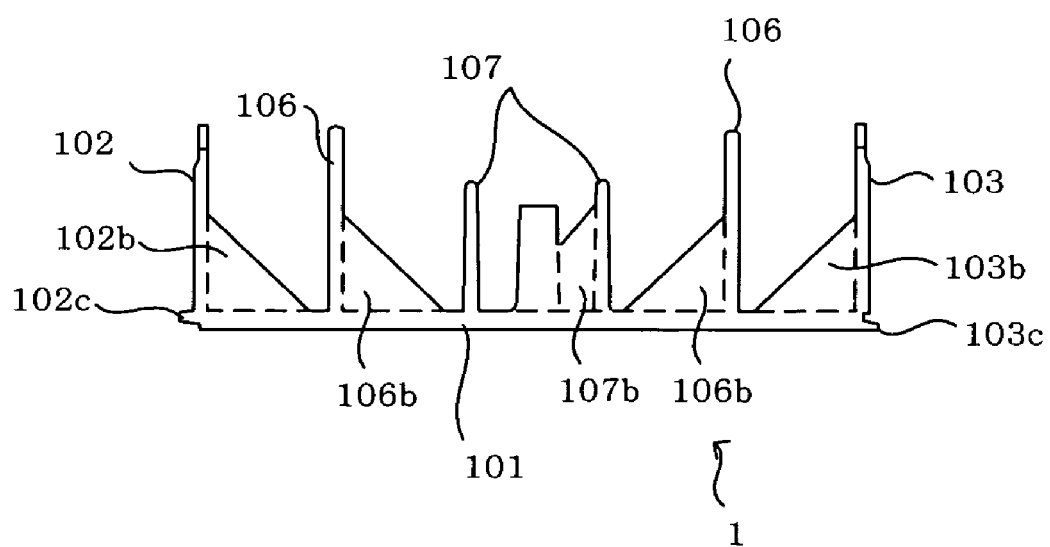
FIG. 6 is a cross-sectional view taken along the B—B line in FIG. 1.

In addition, to prevent deformation of the side plates 102 and 103 and the reinforcing plates 106 and 107, a plurality of laterally projecting, small protruding plates 102b, 103b, 106b and 107b is formed on the inside surfaces of the side plates 102 and 103 and on both side surfaces of the reinforcing plates 106 and 107 (only one side surface of one of the reinforcing plates 107) so that they respectively alternate at positions between adjoining bolt through holes 102a, 103a, 106a and the notched part 107a. As depicted in FIG. 5 and FIG. 6 (cross-sectional view taken along the B—B line in FIG. 1), these are formed as right triangles with their bases continuous with the inner plate 101.

As shown in FIG. 6, a mating part 102c with a protrusion at the upper part and a groove at the lower part is formed along the side edge of the inner plate 101 at the lower end part and across the entire length thereof, and a mating part 103c, having a shape the reverse of the mating part 102c, is formed at the lower end part of the outside surface of the side plate 103.

Figure 15:
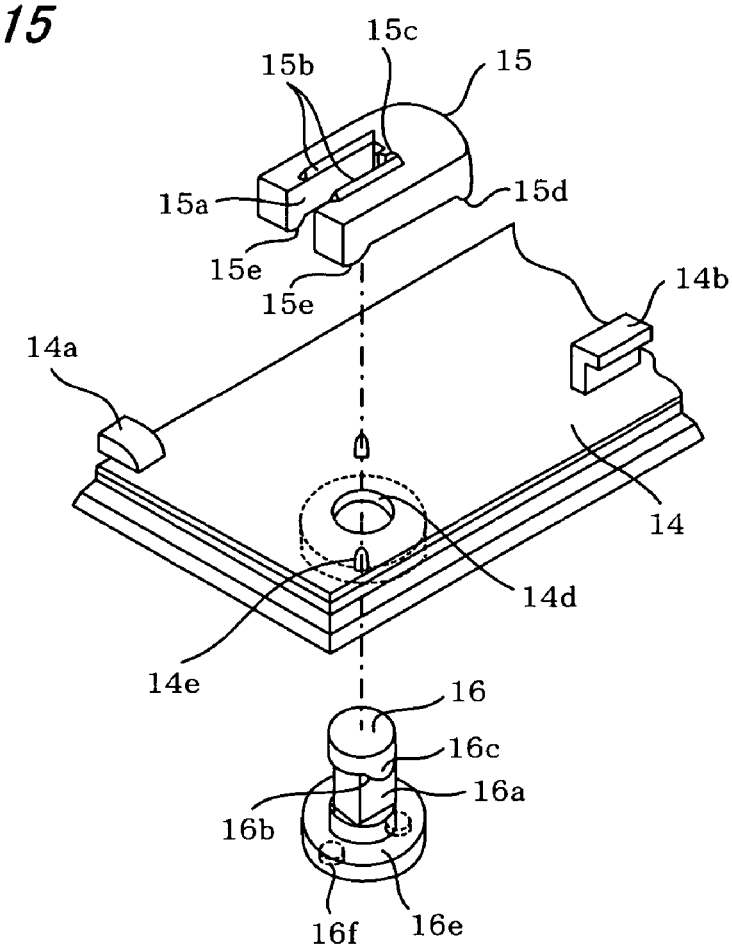
FIG. 15 is a partial exploded perspective view of the cover.
Figure 16:
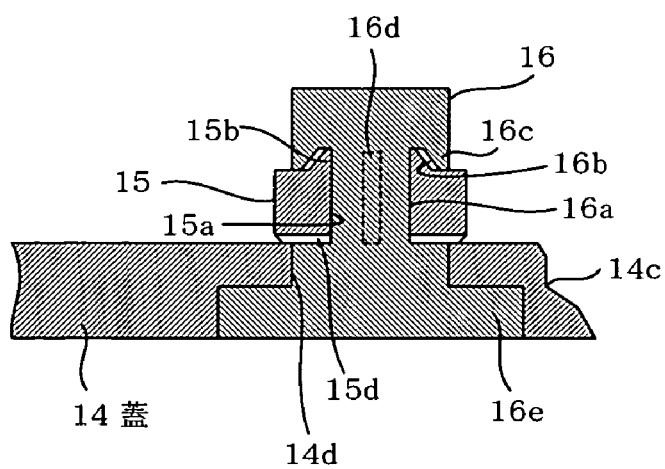

The structure of the cover that plugs the opening 101a of the inner plate 101 will be described in the following based on FIG. 14 through FIG. 16.

FIG. 14a depicts the top surface of the cover 14 (surface corresponding to the outer surface of the arc of the segment 1), FIG. 14b depicts the side surface along the longitudinal direction, and FIG. 14c depicts the side surface along the latitudinal direction. The cover 14 is made of a transparent plastic, the same as the segment 1, and is formed in a rectangular plate shape having a shape and size corresponding to the opening 101a; the side surfaces of the perimeter in all directions thereof are inclined corresponding to the inclination of the inner surfaces of the perimeter of the opening 101a so that they widen from the top surface side to the bottom surface side. Furthermore, the cover 14 is recessed at the upper portion of the inclined perimeter as a recessed part 14c, having the shape of a left angle bracket "<".

A plurality of projections 14a, e.g., four, is provided on the top surface of the cover 14 at four locations on one of the side edges along the longitudinal direction of the top surface thereof, and the tip part of each projects from the abovementioned side edge in parallel with the top surface. In addition, an anchor 14b (refer to FIG. 15), which is a projection whose tip part is bent in an L-shape, is formed at two locations on the top surface of the cover 14 in the vicinity of the side edge opposite to the projections 14a.

In addition, a plurality of engaging members 15, e.g., three, is arranged on the top surface of the cover 14 so that they line up along the side edge opposite the projections 14a, and each is supported by a rotating shaft 16 to be pivotal thereabout in parallel with the top surface of the cover 14. However, the engaging member 15 cannot rotate unless at least a certain amount of pressure is applied thereto because, due to a structure discussed later, the engaging member 15 makes elastic pressure contact with the top surface of the cover 14.

The engaging members 15 and the rotating shafts 16 are formed from a transparent plastic, the same as the main body of the cover 14. As shown in FIG. 15, the engaging member 15 is formed in a U shape with a groove 15a at the center thereof and two thin protruding parts 15b on the top surface thereof along both side edges of the groove 15a. The cross-sectional shape of the protruding part 15b is a trapezoid that is close to a right triangle shape (refer to FIG. 16). In addition, a thin protruding part 15c is formed extending in the longitudinal direction at the surface at the back of the groove 15a. In addition, protruding parts 15d and 15e are formed protruding just a little bit at the bottom surface of each of the tip and the rear of the engaging member 15.

In addition, the intermediate part of the rotating shaft 16 is notched to form a notched part 16a, with its cross-sectional view substantially a square column, and a flange 16e having a diameter greater than the other parts is formed at the lower end part. A groove 16b whose cross-sectional shape corresponds to the protruding part 15b of the engaging member 15 is formed on the inside of the left and right sealing parts in FIG. 16 of the notched part 16a, and a downwardly arcuately shaped tongue part 16c is formed on the outside thereof. In addition, a longitudinal groove 16d (shown by the broken line in FIG. 16) is formed on the rear surface on the right side (not shown in FIG. 15) of the notched part 16a, and two small holes (recessed parts) 16f are formed on the bottom surface of the flange 16e (the lower end surface of the rotating shaft 16).

In addition, three bearing holes 14d that rotatably interfit with and bear the rotating shafts 16 are formed in and pass through the cover 14. The bearing hole 14d has a step; the diameter of the lower part corresponding to the diameter of the flange 16e of the rotating shaft 16; and the diameter of the upper part corresponding to the diameter of the portion above the flange 16e of the rotating shaft 16.

The notched part 16a and the portion above it project above the top surface of the cover 14 in the state where the rotating shaft 16 is inserted from the bottom into the bearing hole 14d until the flange 16e is interfitted with the lower part of the bearing hole 14d and the portion from above the flange 16e to below the notched part 16a is interfitted with the upper part thereof. In this state, the engaging member 15 is attached to the top surface of the cover 14 by inserting and interfitting the engaging member 15 from the side into the notched part 16a.

Since the height of the engaging member 15 (including the protruding part 15d or 15e) is slightly greater than the height from the bottom surface of the notched part 16a to the bottom end of the tongue part 16c, the engaging member 15 is press fitted into and interfitted with the notched part 16a while bending the tongue part 16c at the top surface slightly upward. In this case, as shown in FIG. 16, the left and right portions of the groove 15a of the engaging member 15 engage with the left and right portions of the notched part 16a, each protruding part 15b enters the respective groove 16b, and the protruding part 15c enters the longitudinal groove 16d until it fits therewith. Thus, by press fitting and interfitting the engaging member 15 into and with the notched part 16a, the engaging member 15 is integrally and rotatably attached to the rotating shaft 16, and the engaging member 15 retains the rotating shaft 16 from dropping down.

Furthermore, there is no play in the vertical direction in the engaging member 15 because the tongue part 16c of the rotating shaft 16 elastically presses against the engaging member 15 and the bottom surfaces of the protruding parts 15d and 15e of the engaging member 15 elastically make pressure contact with the top surface of the cover 14.

In the state wherein the engaging member 15 is thus attached, the engaging member 15 can be rotated by engaging a protruding part of a tool (not shown) to each hole 16f of the rotating shaft 16, and rotating the shaft 16 with the tool from the bottom surface side of the cover 14. To limit the rotation, two stoppers 14e are formed as projections on the top surface of the cover 14 in the vicinity of each bearing hole 14d. The contact of the engaging member 15 with these stoppers 14e limits the rotation of the engaging member 15 to 90 degrees from the rotational position depicted in FIG. 14a (hereinafter, referred to as the initial position) to the rotational position depicted in FIG. 19 (hereinafter, referred to as the engaging position). At the initial position in FIG. 14a, the orientation of the U shape of the engaging member 15 is parallel with the longitudinal direction of the cover 14, and its entirety is above the top surface of the cover 14 (inside the side edge of the top surface). At the engaging position in FIG. 19, the orientation of the U shape of the engaging member 15 is perpendicular to the longitudinal direction of the cover 14, and the tip end part projects outward from the top surface of the cover 14 and from the side edge opposite the projection 14a.

The existing pipe rehabilitation work using the segments 1 will be explained in the following. In this construction work, the segments 1 are first carried into the manhole 5 in communication with the existing pipe 4 as shown in FIG. 11, but the bolts 9 for coupling the pipe units 2 are fixed beforehand to the segment 1, as shown in FIG. 10.

To fix the bolts 9, they are first inserted from one of the side plates 102 and 103 of the segment 1, e.g., from the bolt through holes 102a of the side plate 102, and then inserted through the bolt through holes 106a and the notched parts 107a of the reinforcing plates 106 and 107 and the bolt through holes 103a of the side plate 103 with the head of the bolt 9 inserted to the position where it contacts the reinforcing plate 106 on the side of the side plate 102. Furthermore, a nut 10 is screwed onto the tip part of the bolt 9 protruding outwardly from the side plate 103 and tightened to a position at which it contacts the reinforcing plate 106 on the side of the side plate 102. To position the bolt, a cylindrical positioning member 19 (shown by the broken line) is passed through from the tip side of the bolt 9 and inserted to a position at which it contacts the reinforcing plate 106 on the side of the side plate 103. The positioning member 19 positions the bolt 9 concentric with a bolt through hole 103a, and aligns the positions of the bolt through holes 102a and 103a of mutually coupled pipe units 2, as discussed later.

Furthermore, the number of bolts 9 fixed is less than half the number of bolt through holes 102a, and the like, and one bolt 9 is fixed for every other or every two or more bolt through holes. In addition, the length of the portion of the fixed bolt 9 protruding from the side plate 103 is set to such a length that it is slightly less than the width of the segment 1 (from the outer surface of the side plate 102 to the outer surface of the side plate 103).

Figure 8:
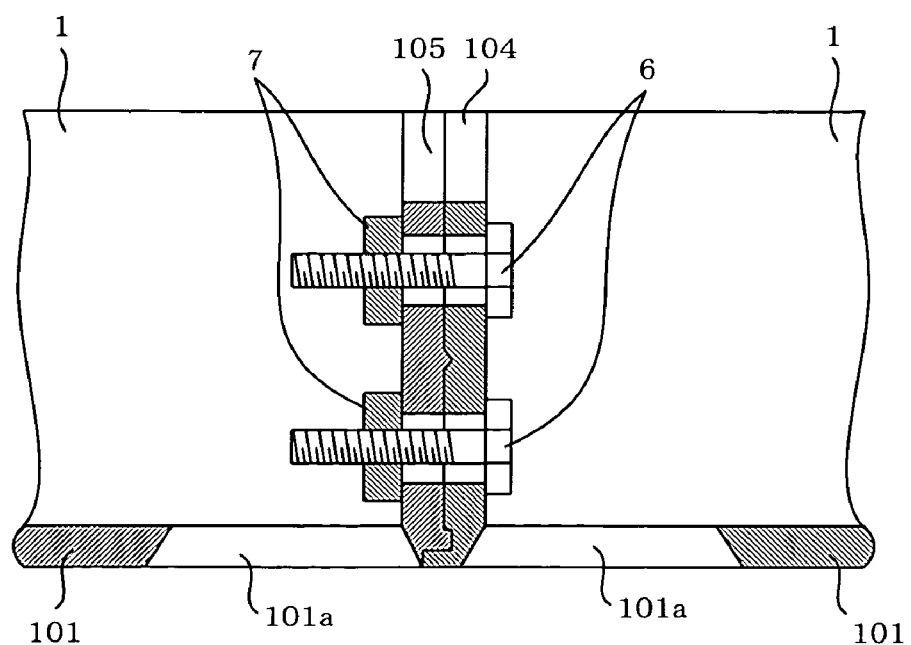
FIG. 8 is a longitudinal side view showing how the segments are mutually coupled.
Figure 9:
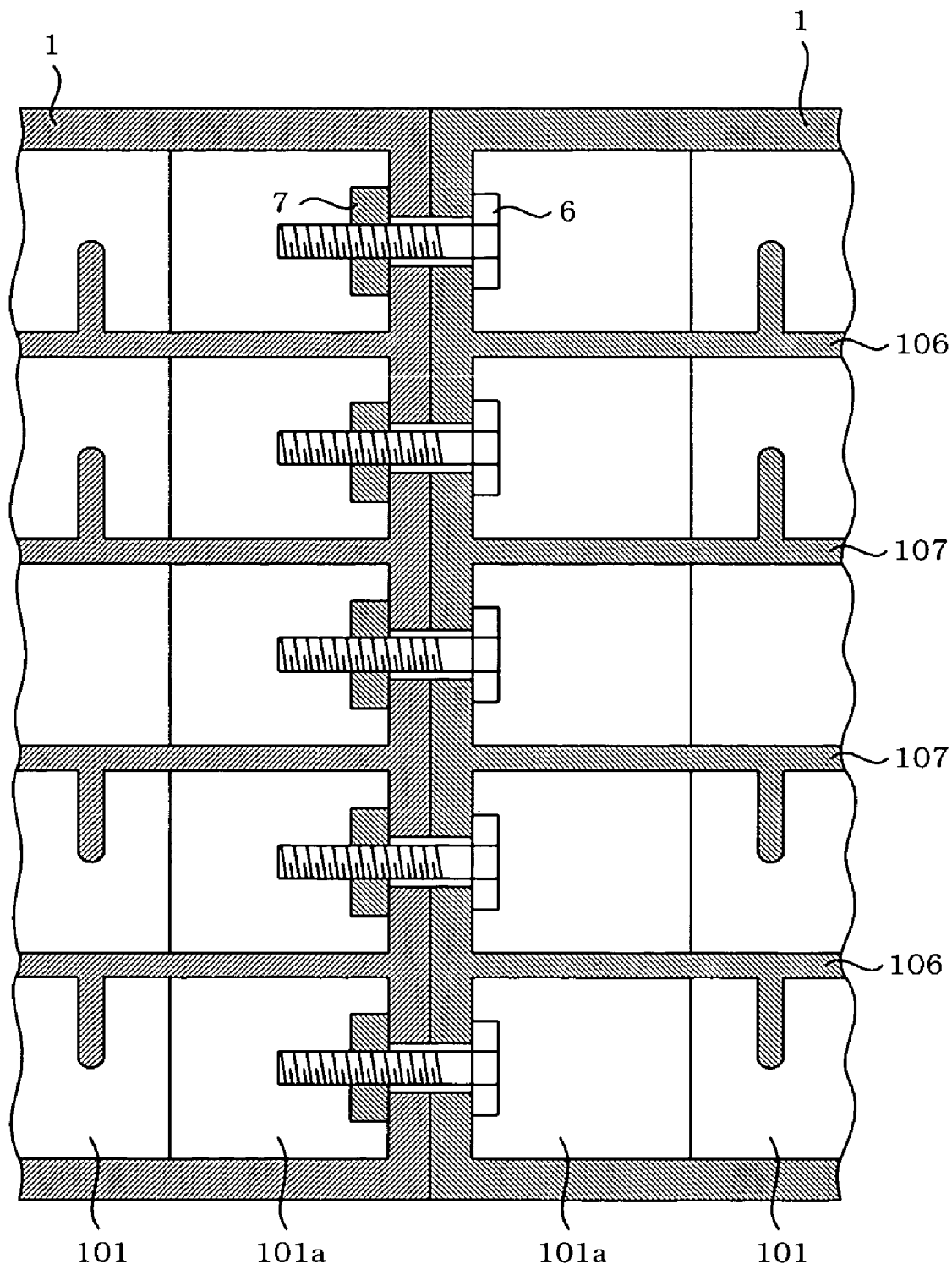
FIG. 9 is a transverse plan view showing how the segments are mutually coupled.

Thus, a plurality of segments 1, to which the bolts 9 are fixed, is coupled in the circumferential direction, as shown in FIG. 7 through FIG. 9. Namely, the protruding parts 105c and the mating part 105d of the end plate 105 of the segment 1 on the left side in FIG. 7 are first respectively interfitted with the groove 104c and the mating part 104d of the end plate 104 of the segment 1 on the right side, thereby mutually tightly sealing the end plates 104 and 105. Next, the bolts 6 shown in FIG. 8 and FIG. 9 are introduced from the openings 101a of the inner plate 101 of the right side segment 1 and passed through the bolt through holes 104a and 105a of the end plates 104 and 105. The nuts 7 are then introduced from the openings 101a of the left side segment 1 and screwed onto the bolts 6 and tightened to the end plate 105, thereby mutually coupling both the segments 1 and 1.

The pipe unit 2 as shown in FIG. 11 is thus assembled by successively coupling a plurality of segments 1 in the circumferential direction. At that time, the cover 14 in FIG. 14 is interfitted with and fixed to the opening 101a of the inner plate 101 of the segment 1 coupled in the circumferential direction.

Figure 17C:
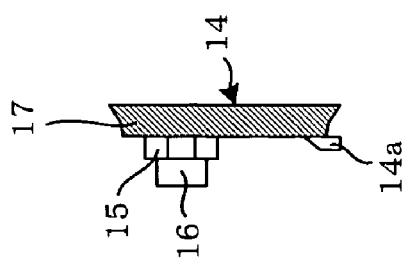
FIG. 17c is a side view taken along the latitudinal direction.
Figure 17A:
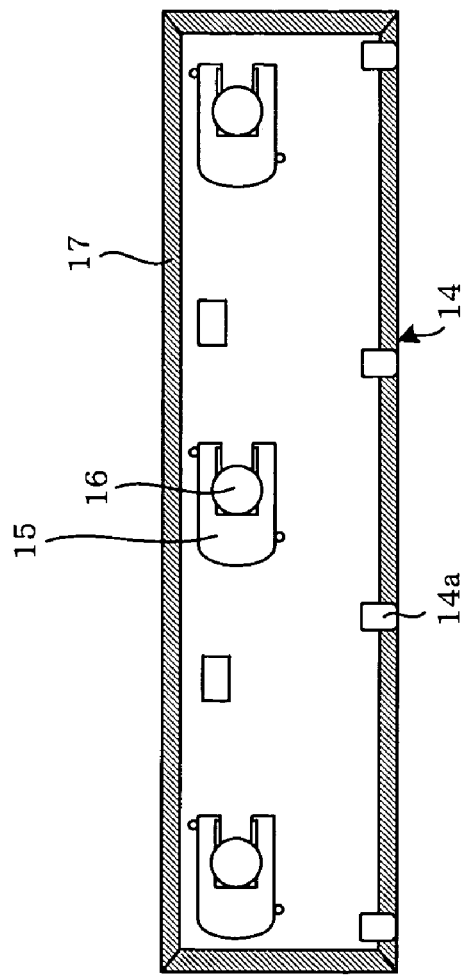
FIG. 17a is a top view of the cover coated with the sealing material.
Figure 17B:
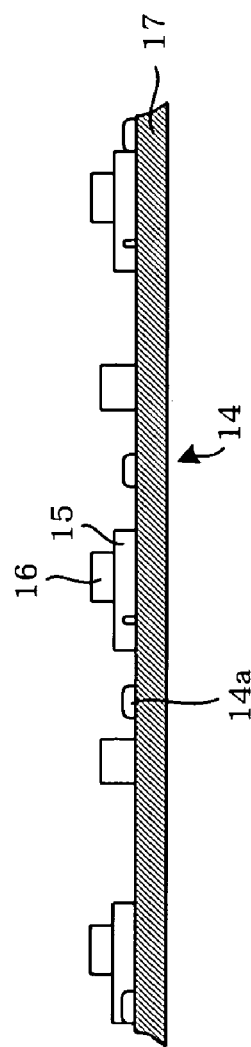
FIG. 17b is a side view taken along the longitudinal direction.

In that case, the engaging members 15 of the cover 14 are first rotated to the initial position of FIG. 14a, as mentioned above, and the side surfaces of the perimeter of the cover 14, as shown by the hatching in FIGS. 17a, 17b and 17c, are coated with a sealing material 17. The sealing material 17 has good application properties and chemical resistance properties, and is, for example, a single component polyurethane type liquid moisture curing type.

Figure 18:
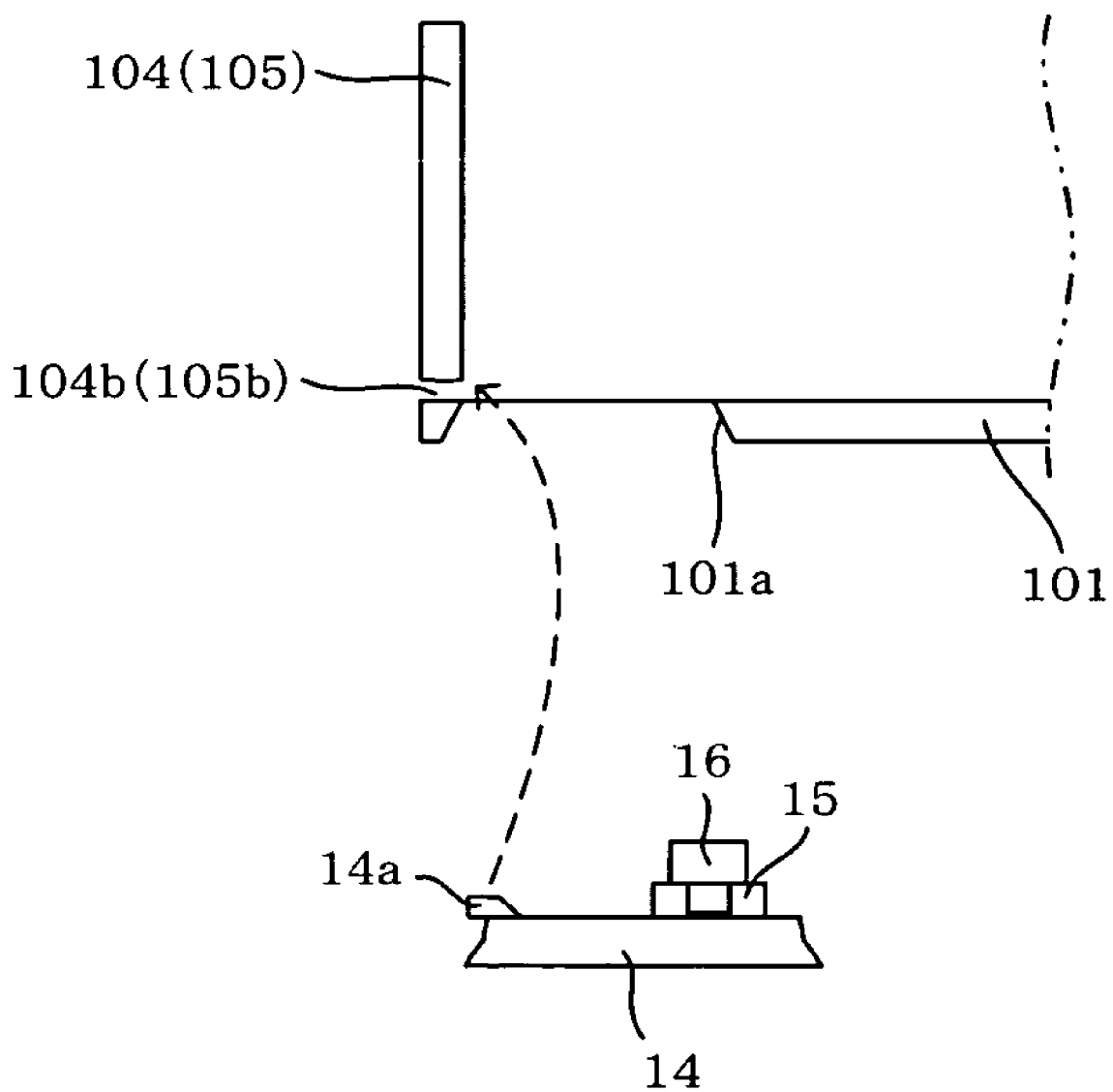
FIG. 18 is an explanatory view showing how the projections of the cover are engaged with the engaging holes of the end plate when the cover is fitted into the opening.

Next, the cover 14 is fitted to the opening 101a from the bottom surface side of the inner plate 101, as shown by the broken line arrow in FIG. 18, and each projection 14a is inserted into and engaged with the engaging hole 104b (or 105b) of the end plate 104 (or 105) of the segment 1 wherein the bottom surface of the engaging hole 104b (or 105b) is positioned in alignment with the top surface of the inner plate 101.

Figure 19A:
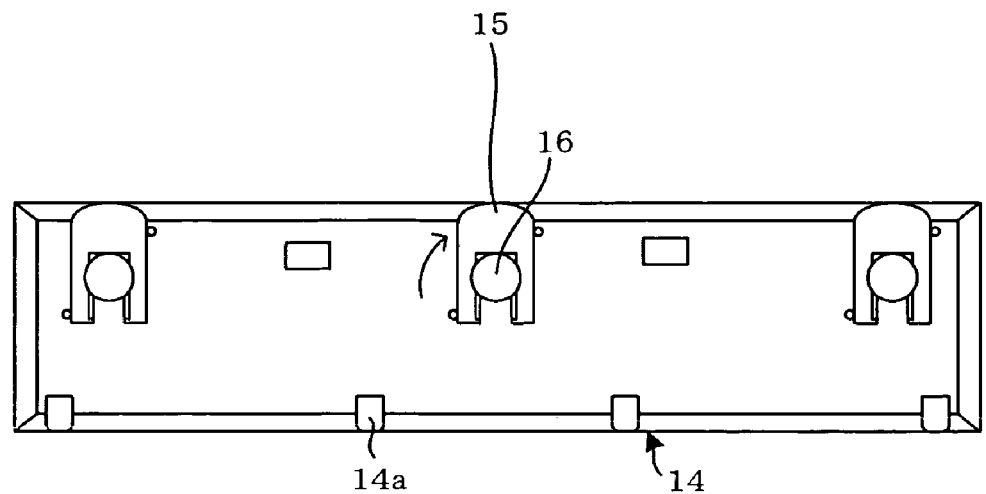
FIG. 19a is a top view of the cover showing how the engaging member of the cover is rotated to fix the cover.
Figure 19B:
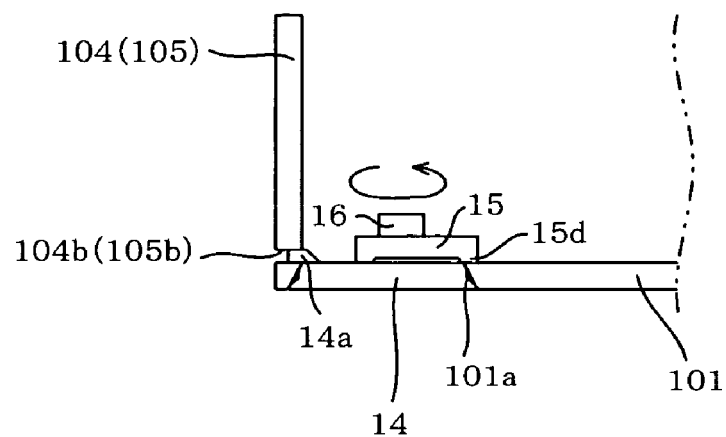
FIG. 19b is a schematic cross-sectional view of the vicinity of the opening.
Figure 20:
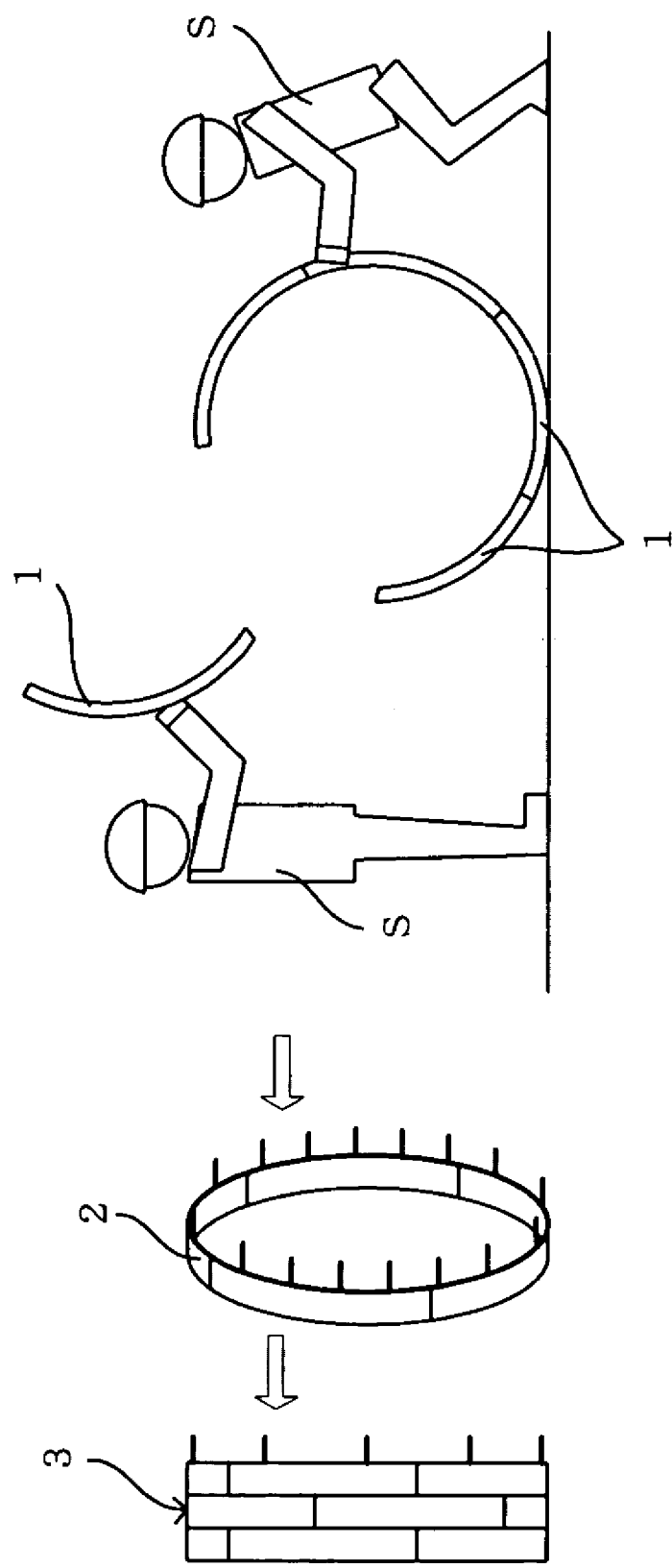
FIG. 20 is an explanatory diagram showing how the circular rehabilitating pipe is ring assembled.
Figure 21:
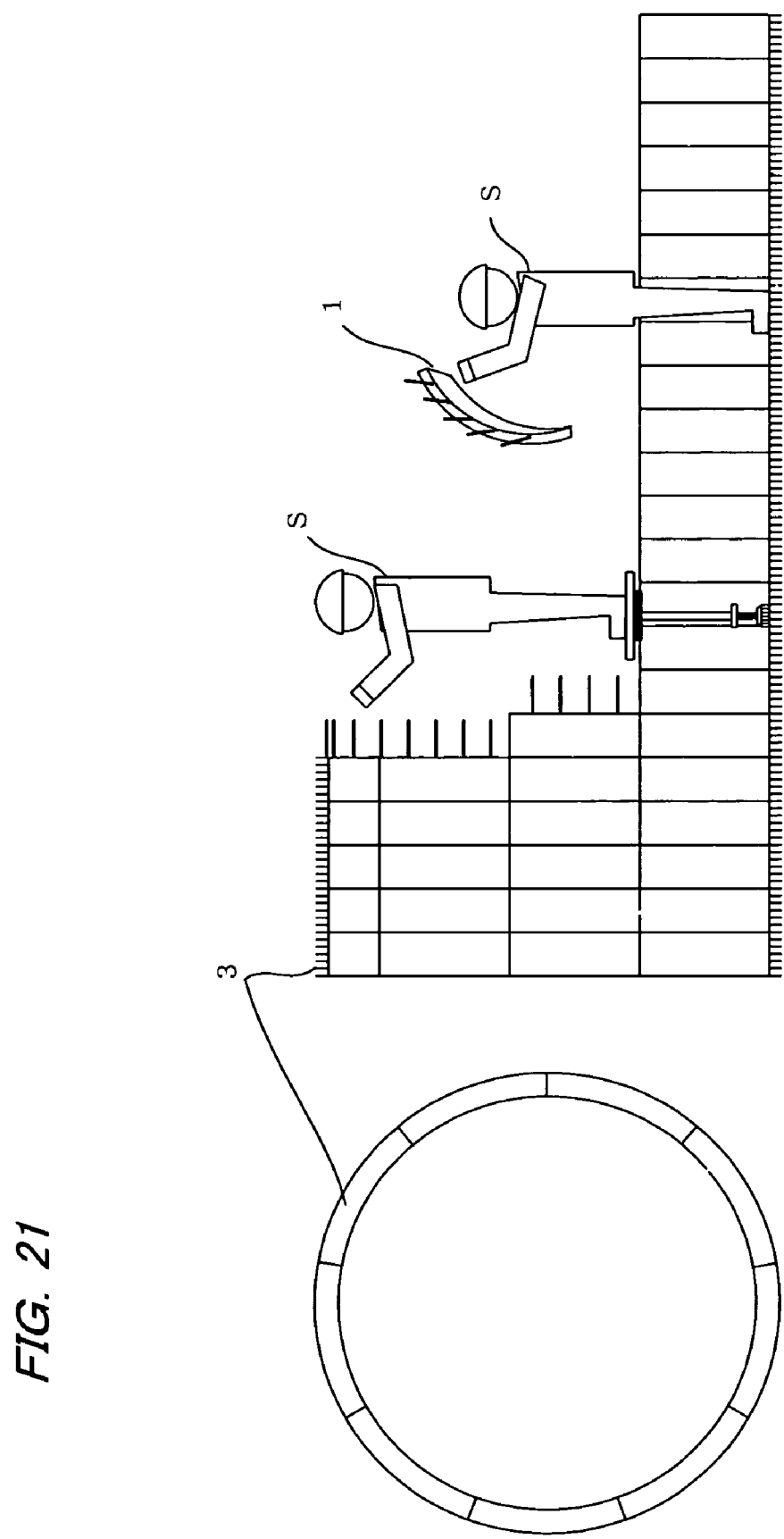
FIG. 21 is an explanatory diagram showing how a large diameter circular rehabilitating pipe is segmental assembled.
Figure 22:
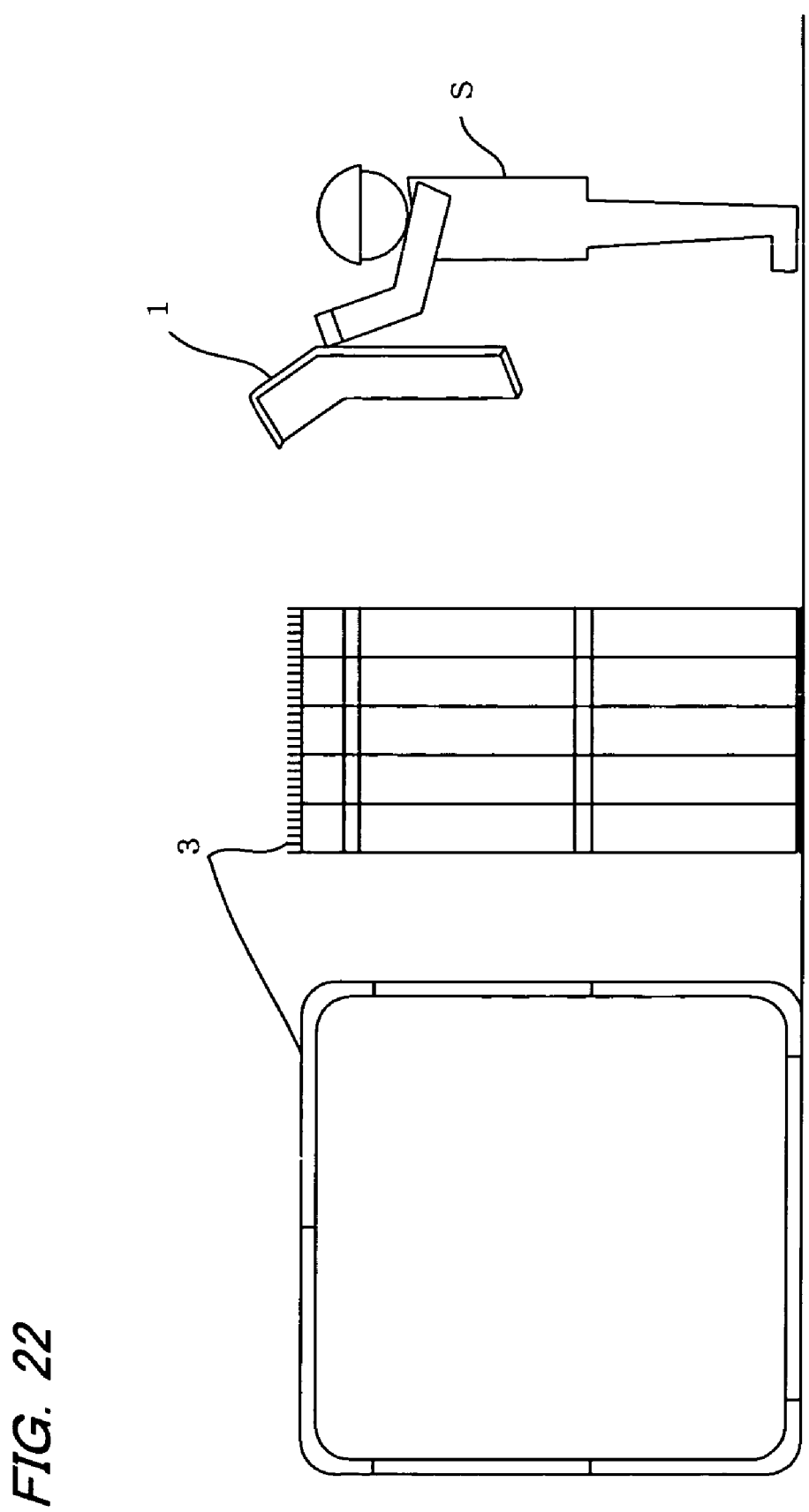
FIG. 22 is an explanatory diagram showing how a rectangular rehabilitating pipe is segmental assembled.
Figure 23A:
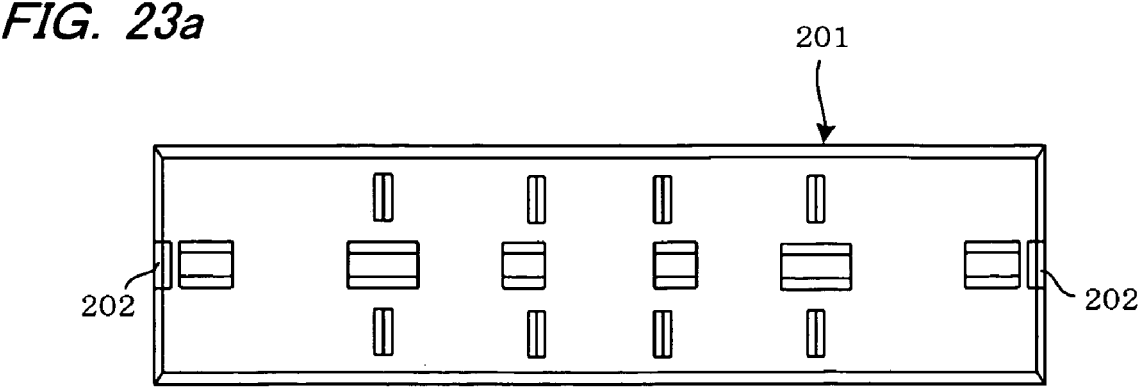
FIG. 23a is a top view showing the structure of a conventional cover.
Figure 23B:
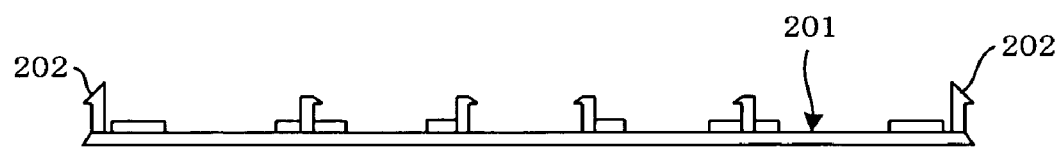
FIG. 23b is a side view showing the structure of a conventional cover.
Figure 24:
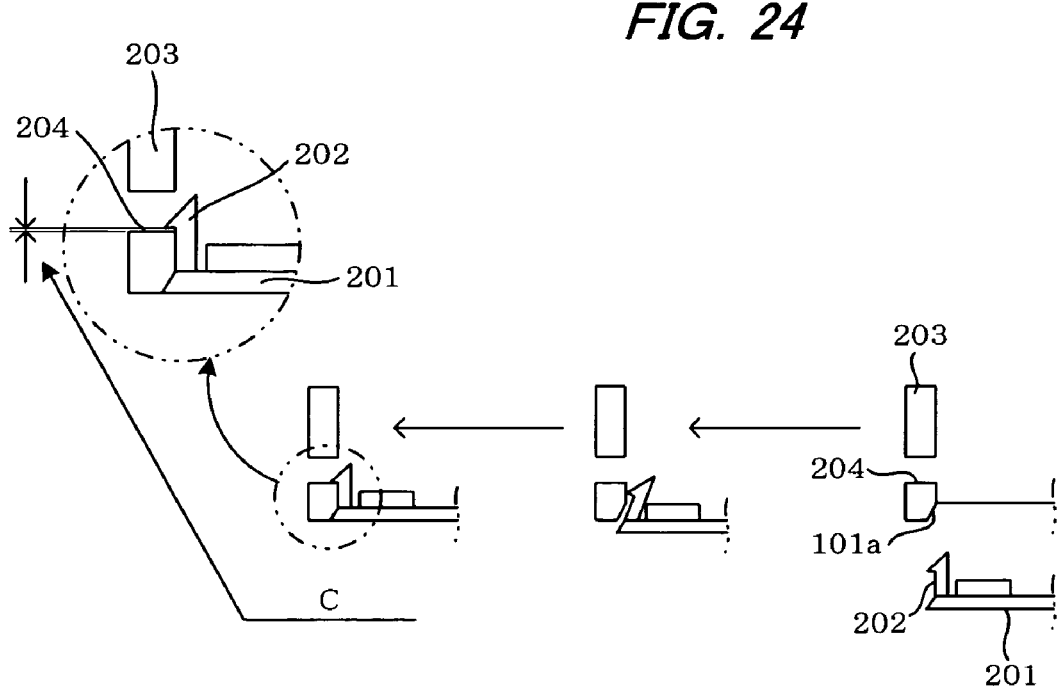
FIG. 24 is an explanatory diagram showing how a conventional cover is fixed to the opening.

Further, in the state wherein the cover 14 is pressed and the side surface of the perimeter of the cover 14 is attached by pressure to the side surface of the perimeter of the opening 101a, a tool (not shown) is engaged to the holes 16f in the bottom surface of the flange 16e of the rotating shaft 16 exposed to the bottom surface of the cover 14, and the rotating shaft 16 is rotated, thereby rotating the respective engaging member 15 by 90 degrees to the above mentioned engaging position, as shown in FIGS. 19a and 19b. The tip part of each engaging member 15 thus protrudes outwardly from the side edge of the cover 14, and the protruding part 15d is elastically pressed to and engaged with the top surface of the inner plate 101 on the side opposite the end plate 104 (or 105). The cover 14 is thus fixed to the inner plate 101 at the opening 101a.

After the pipe units 2 are thus assembled, the pipe units 2 are successively carried inside the existing pipe 4 to the rehabilitating pipe assembly position, and successively coupled in the longitudinal direction to construct the rehabilitating pipe 3.

FIG. 10 shows how the bolts 9 are used to mutually couple the pipe units 2. To couple the left side pipe unit 2 to the right side pipe unit 2, which is assembled to the rehabilitating pipe 3, each bolt 9 protruding from the side plate 103 of the segment 1 of the right side pipe unit 2 is first inserted through the bolt through holes 102a and 106a and the notched part 107a of the side plate 102 and the reinforcing plates 106 and 107 with the positioning member 19 inserted into the bolt through hole 102a. The side plate 102 of the segment 1 of the left side pipe unit 2 is then pressed against the side plate 103 of the segment 1 of the right side pipe unit 2, and the mating part 102c shown in FIG. 6 is interfitted with the mating part 103c to tightly seal the side plates 102 and 103. At this time, the tip part of each bolt 9 protruding from the segment 1 of the right side pipe unit 2 reaches the vicinity of the inside of the side plate 103 of the segment 1 of the left side pipe unit 2, so that the nut 10 may be screwed onto the tip part of the bolt 9 from the bolt through hole 103a and tightened to the reinforcing plate 106 of the adjacent side plate 103, thereby fixing and coupling the left side pipe unit 2 to the right side pipe unit 2. In this manner, as shown in FIG. 11 through FIG. 12, the rehabilitating pipe 3 is constructed by successively coupling the pipe units 2 to a required length.

Figure 13:
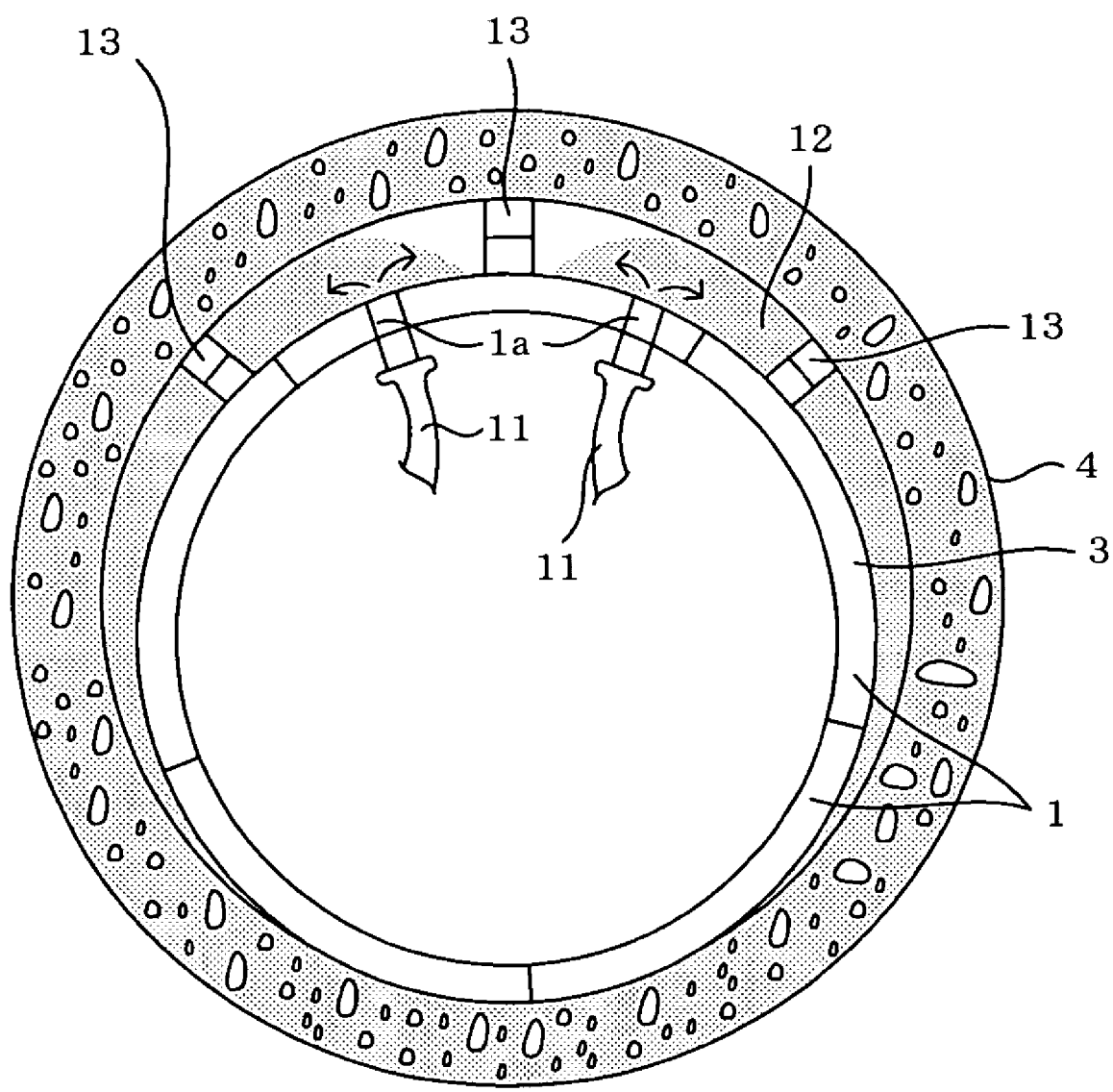
FIG. 13 is a cross-sectional view showing how filler is poured into the space of the gap between the outer periphery of the assembled rehabilitating pipe and the inner wall surface of the existing pipe.

Incidentally, the assembled rehabilitating pipe 3 has a specific gravity less than the filler, which is discussed later, and floats on the filler, so that it is necessary to press the rehabilitating pipe 3 downward and, at a position wherein the rehabilitating pipe 3 is offset slightly downward from the position concentric with the existing pipe 4, adjust its position to a position wherein the lower end of the outer perimeter thereof contacts the bottom of the existing pipe 4. Consequently, every time a plurality of pipe units 2 is coupled and a rehabilitating pipe 3 of a prescribed length (e.g., approximately 1 meter) is assembled, positional adjustment is performed by inserting spacers 13, as shown in FIG. 13, at a plurality of locations on the top side outer periphery of the rehabilitating pipe 3 between the outer periphery thereof and the inner wall surface of the existing pipe 4.

After the assembly and positional adjustment of the entire length of the rehabilitating pipe 3 is completed, supports (not shown) for preventing deformation of the rehabilitating pipe 3 during filling of the following filler are installed vertically and horizontally inside the rehabilitating pipe 3 at an interval of approximately several meters. Subsequently, as shown in FIG. 13, the space in the gap between the inner wall surface of the existing pipe 4 and the outer periphery of the rehabilitating pipe 3 together with the space in the segments 1 of the rehabilitating pipe 3 is filled with a filler 12. This filler 12 is a resin mortar whose principle components are a cement mortar, or an epoxy resin or a polyester resin, and the like. That filling is performed every few meters of the length of the rehabilitating pipe 3 by forming a hole 1a at a position in the segment 1, connecting a filling hose 11 thereto, and pouring the filler 12 in from this hose 11. Furthermore, prior to this filling, the gap between the outer periphery on both ends of the assembled rehabilitating pipe 3 and the inner wall surface of the existing pipe 4 is plugged with a sealing material comprising a resin putty or a mortar (not shown).

After filling with the filler 12 is completed, the filler 12 sets and hardens, and then the existing pipe rehabilitation construction work is completed by plugging the hole 1a with the sealing material, removing the supports (not shown), and the like. Furthermore, the fixing of the cover 14 to the opening 101a is reinforced by each of the anchors 14b on the cover 14 biting into the filler 12 to be hardened.

According to the present embodiment as described above, the fixing of the cover 14 to the opening 101a can be performed simply as discussed earlier based on FIG. 17 through FIG. 19. When the cover 14 is pressure fitted and attached to the opening 101a as shown in FIG. 18 with the side surface of the perimeter of the cover 14 coated with the sealing material 17 as shown in FIG. 17, the sealing material does not fortunately delaminate because the cover 14 is fitted as is, without sliding it as in the conventional case. In addition, because the sealing material 17 pools in the recessed part 14c formed in the side surface of the perimeter of the cover 14, coating can be performed with just the sufficient amount of the sealing material. The pressure attaching of the cover further causes the sealing material 17 to be spread adequately to assure sealing.

In addition, because the cover 14 is free when the projections 14a are inserted into the engaging holes 104b or 105b and engaged with the top surface of the side edge part of the opening 101a, the projections 14a can be engaged without hindrance, even if there is practically no clearance between the projections 14a and the engaging holes 104b and 105b.

In addition, as shown in FIG. 19, each of the engaging members 15 is rotated to the engaging position to fix the cover 14 to the inner plate 101 on the side edge of the opening 101a thereof, and, at this position, the protruding part 15d of the tip part of each engaging member 15 elastically makes pressure contact and engages with the top surface of the inner plate on one of the side edges along the longitudinal direction of the opening 101a. Consequently, the side surface of the periphery of the cover 14 is elastically attached to the side surface of the perimeter of the opening 101a, and clearance is therefore not created between the side surfaces of the two.

Accordingly, even if pressure is applied from the filler, clearance is not created between the side surface of the perimeter of the cover 14 and the side surface of the perimeter of the opening 101a, and a sufficient sealing effect is obtained as discussed above. Therefore, sufficient water tightness can be ensured at the portion of the plugged opening 101a wherein the cover 14 is fixed.

The above embodiment is for the case where the rehabilitating pipe 3 is ring assembled. However, it is understood that the present invention can be applied even in cases where the rehabilitating pipe is segmental assembled because the fixing structure of the cover 14 can fix the cover 14 from the bottom surface side of the segment 1 (the inner surface side of that arc).

What is claimed is:

1. A segment that is coupled to additional segments to constitute a rehabilitating pipe for rehabilitating an existing pipe such as a sewer pipe, comprising
    an inner plate that defines the inner circumferential surface of the rehabilitating pipe and has an opening therein for performing the work of mutually coupling the segments in the circumferential direction of the rehabilitating pipe, and
    a cover that is fitted into the opening of the inner plate, wherein the cover is provided with a projection and with an engaging member that is movable between non-engaging and engaging positions and the cover is fitted into the opening with the projection into engagement with the inner plate on one side edge of the opening, the engaging member being then moved to the engaging position where it comes into engagement with the inner plate on the other side edge thereof, thereby fixing the cover to the inner plate to plug the opening thereof.

2. A segment as set forth in claim 1, wherein the engaging member is configured so that it makes elastic pressure contact with the top surface of the cover, and the tip of the engaging member makes elastic pressure contact with and engages with the inner plate when the engaging member is moved to the engaging position.

3. A segment as set forth in claim 2, wherein the tip of the engaging member protrudes downward to makes elastic pressure contact with and engages with the inner plate when the engaging member is moved to the engaging position.

4. A segment as set forth in claim 1, wherein the engaging member is configured so that it may be rotated for movement between the non-engaging and engaging positions.

5. A segment as set forth in claim 1, wherein the inner surface of the perimeter of the opening of the inner plate is inclined so that it widens from the top surface side to the bottom surface side of the inner plate, and the side surface of the perimeter of the cover also is inclined so that it widens from the top surface side to the bottom surface side of the cover.

6. A segment as set forth in claim 5, wherein a recessed part is formed in the inclined side surface of the perimeter of the cover to pool sealing material coated on the side surface thereof.

7. A segment as set forth in claim 1, wherein the engaging member is integrally and rotatably attached to a rotating shaft on the cover and is brought into pressure contact with the top surface thereof.

8. A segment as set forth in claim 7, wherein the lower surface of the rotating shaft is exposed to the bottom surface of the cover and is provided in the lower surface with a hole that engages a tool for rotating the rotating shaft.

9. A segment as set forth in claim 1, wherein a stopper is formed in the cover for limitation of movement of the engaging member between the two non-engaging and engaging positions.

10. A segment as set forth in claim 1, wherein an anchor is formed on the cover for biting into the filler that is filled in the gap between the outer periphery of the rehabilitating pipe and the inner wall surface of the existing pipe.

* * * * *